United States Patent
Takabayashi

(10) Patent No.: US 8,423,808 B2
(45) Date of Patent: Apr. 16, 2013

(54) CONTROL DEVICE AND CONTROL SYSTEM

(75) Inventor: Yuuji Takabayashi, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 551 days.

(21) Appl. No.: 12/698,535

(22) Filed: Feb. 2, 2010

(65) Prior Publication Data

US 2010/0198366 A1    Aug. 5, 2010

(30) Foreign Application Priority Data

Feb. 5, 2009  (JP) .................................. 2009-025133

(51) Int. Cl.
G06F 1/00 (2006.01)
G06F 1/26 (2006.01)
G06F 1/32 (2006.01)
G06F 15/16 (2006.01)

(52) U.S. Cl.
USPC ............................. 713/320; 713/300; 709/249

(58) Field of Classification Search .................... None
See application file for complete search history.

(56) References Cited

U.S. PATENT DOCUMENTS

| 7,457,301 | B2 * | 11/2008 | Furuta et al. ................. 370/401 |
| 7,966,503 | B2 * | 6/2011 | Kimura ......................... 713/320 |
| 2007/0230401 | A1 * | 10/2007 | Rayzman et al. ............. 370/331 |
| 2009/0030970 | A1 * | 1/2009 | Siegmund ..................... 709/202 |
| 2009/0248829 | A1 * | 10/2009 | Habetha et al. ............... 709/208 |

FOREIGN PATENT DOCUMENTS

| JP | 2005-135383 A | 5/2005 |
| JP | 2008-004025 A | 1/2008 |
| JP | 2008-199091 A | 8/2008 |

OTHER PUBLICATIONS

Notice of Allowance dated Apr. 12, 2011, issued in corresponding Japanese Patent Application No. 2009-025133.

* cited by examiner

Primary Examiner — Ji H Bae

(74) Attorney, Agent, or Firm — Westerman, Hattori, Daniels & Adrian, LLP

(57) ABSTRACT

A control device includes a communication unit which has a switch function of switching the control device into an energy saving mode, the communication unit communicating with an upper terminal via a first network; and a mode control unit which controls switching the communication unit into the power saving mode, the control being made using a network control library which is generated by a programming language.

6 Claims, 3 Drawing Sheets

CONTROL DEVICE AND CONTROL SYSTEM

BACKGROUND OF THE INVENTION

1. Field of the Invention

The present invention relates to a control device and a control system.

Priority is claimed on Japanese Patent Application No. 2009-025133, filed Feb. 5, 2009, the contents of which are incorporated herein by reference.

2. Description of Related Art

A conventional process control system is known, which is used in an oil field or a gas field. In the conventional process control system, various field devices such as a thermometer, a pressure meter, a flow meter and a valve which are provided in a plant equipment are automatically controlled. Then, a process controller which has a network communication function is connected to a maintenance management terminal or other controller via a LAN (Local Area Network) to be able to communicate with each other. Then, the process controller is connected to a remote monitoring terminal which is located in a remote location to be able to communicate with each other via a wireless network. For example, Japanese Unexamined Patent Publication, First Publication No. 2008-199091 discloses a communication system which is used for the above-mentioned process control system.

The aforementioned process controller supplies a process data which is collected from various field devices to a maintenance management terminal and other controller via the LAN, or supplies the process data to a remote monitoring terminal via the wireless network. Therefore, a system administrator is allowed to perform reading and managing of process data, and remote operation of the process controller by the remote monitoring terminal, even if the system administrator resides in a remote location. On the other hand, a field engineer is allowed to perform reading and managing of process data and maintenance inspection operation of each device which includes the process controller, by the maintenance management terminal.

The process controller includes a network controller for performing a communication connection with the LAN (TCP/IP connection) and data transmission and reception via the LAN. Generally, the network controller is mounted on a substrate as a discrete semiconductor IC chip which is separate from a CPU (Central Processing Unit). The network controller regularly or irregularly performs communication operation (communication connection, data transmission and reception) in response to a request from the CPU or a request from the maintenance management terminal or other controller. Therefore, the network controller has a larger power consumption relative to other parts or components.

A chemical plant such as an oil field or a gas field is often constructed in a place which is poor in power supply infrastructure.

Therefore, it has been proposed to use a solar power generation to compensate power shortage. Thus, it is necessary to reduce power consumption of the process control system as a whole. Therefore, a method of reducing power consumption has been proposed to improve the network controller which has large power consumption.

For example, a network controller can be used which has a switching function to a power saving mode. In the network controller, a process controller has a manual power saving function and an automatic power saving function. The manual power saving function allows the network controller to be manually set into or reset from the power saving mode. The automatic power saving function monitors data received by the network controller so as to set the network controller into the power saving mode if any data is not received during a predetermined time period.

In case of the aforementioned manual power saving function, an external switch which is manually-operable is provided in the process controller. A power saving management function of the CPU transmits, to the network controller, instructions which switch between ON-state and OFF-state of the power saving mode in response to a switching operation of the external switch. In case of the automatic power saving function, the number of reception data of the network controller is monitored by the power saving management function. If data is not received during a monitoring time period, instructions which switch the power saving mode to the ON-state are transmitted to the network controller by the power saving management function.

SUMMARY OF THE INVENTION

In the prior art, there is no other means than the above-described external switch which manually switches the power saving mode of the network controller. Therefore, it has been unable to control switching the power saving mode of the network controller from the remote monitoring terminal which is located in a remote location. To transmit switching instructions of the power saving mode to the process controller from the remote monitoring terminal, it is necessary to install a special communication protocol.

In the prior art, a control function to the power saving mode is pre-determined and fixed by a system designer.
It is difficult that an end user such as a system administrator or a field engineer optionally modifies or installs the control function of the power saving mode based on a system management. For example, to control the power saving mode by the remote monitoring terminal, it is necessary to install a special communication protocol.
Therefore, it is difficult for end users to establish or install the communication protocol.

An object of the present invention is to provide a control device and a control system which allow end users to easily and optionally modify and install the control function of the power saving mode of a communication unit based on a system operation.

(1) According to one aspect of the present invention, there is provided a control device comprising: a communication unit which has a switch function of switching the control device into an energy saving mode, the communication unit communicating with an upper terminal via a first network; and a mode control unit which controls switching the communication unit into the power saving mode, the control being made using a network control library which is generated by a programming language.

(2) Moreover, in the above described control device, wherein the network control library is a software component which has a function of outputting a value which is necessary to control switching the control device into the power saving mode, the control being made according to at least one input valuable, the mode control unit comprises: a remote instruction detection unit which detects the input valuable which is included in a remote instruction given by a remote monitoring terminal via a second network which is different from the first network, and the remote instruction detection unit outputting an output value as a mode control signal, the output value being obtained from the network control library based on the detected input valuable, and a power saving control unit which controls switching the control device into the power saving mode, the control being made based on the mode control signal.

(3) Moreover, in the above described control device, further comprising: a memory unit which stores a monitoring time and a frame classification as a mode control parameter, the monitoring time being a time for monitoring the transmission-reception frame transmitted and received by the communication unit, the frame classification designating a group of frames which are subject to the monitoring; a transmission-reception frame information management unit which manages a frame-related information that includes the monitoring time and the frame classification, wherein the power saving unit determines whether or not in the monitoring time there is performed at least one of transmission and reception of the transmission-reception frame classified in the group of frames subject to the monitoring, the determination being made based on the frame-related information, and the power saving unit selects the power saving mode if in the monitoring time there is not performed the at least one of transmission and reception of the transmission-reception frame.

(4) Moreover, in the above described control device, wherein the power saving unit switches the power saving mode to an OFF-state when the power saving unit receives a request of transmitting the transmission frame from a communication application of the control device.

(5) Moreover, in the above described control device, further comprising a manually-operable switch, wherein the power saving control unit controls switching the power saving mode between the ON-state and the OFF-state, the control being made by ON-OFF operations of the switch.

(6) According to another aspect of the present invention, there is provided a control system comprising: a control device; a control object device to be controlled by the control device; and an upper terminal that is capable of communication to the control device through a first network, wherein the control device comprises: a communication unit which has a switch function of switching the control device into an energy saving mode, the communication unit communicating with an upper terminal via a first network; and a mode control unit which controls switching the communication unit into the power saving mode, the control being made using a network control library which is generated by a programming language.

(7) Moreover, in the above described control system, wherein the network control library is a software component which has a function of outputting a value which is necessary to control switching the control device into the power saving mode, the control being made according to at least one input valuable, the mode control unit comprises: a remote instruction detection unit which detects the input valuable which is included in a remote instruction given by a remote monitoring terminal via a second network which is different from the first network, and the remote instruction detection unit outputting an output value as a mode control signal, the output value being obtained from the network control library based on the detected input valuable, and a power saving control unit which controls switching the control device into the power saving mode, the control being made based on the mode control signal.

(8) Moreover, in the above described control system, further comprising: a memory unit which stores a monitoring time and a frame classification as a mode control parameter, the monitoring time being a time for monitoring the transmission-reception frame transmitted and received by the communication unit, the frame classification designating a group of frames which are subject to the monitoring; a transmission-reception frame information management unit which manages a frame-related information that includes the monitoring time and the frame classification, wherein the power saving unit determines whether or not in the monitoring time there is performed at least one of transmission and reception of the transmission-reception frame classified in the group of frames subject to the monitoring, the determination being made based on the frame-related information, and the power saving unit selects the power saving mode if in the monitoring time there is not performed the at least one of transmission and reception of the transmission-reception frame.

(9) Moreover, in the above described control system, wherein the power saving unit switches the power saving mode to an OFF-state when the power saving unit receives a request of transmitting the transmission frame from a communication application of the control device.

(10) Moreover, in the above described control system, further comprising a manually-operable switch, wherein the power saving control unit controls switching the power saving mode between the ON-state and the OFF-state, the control being made by ON-OFF operations of the switch.

EFFECT OF THE INVENTION

According to the present invention, a control device controls a control object device based on a control program generated by a predetermined programming language. The control device controls switching of a power saving mode of the communication unit, the switching being made using a network control library generated by the programming language.

Therefore, end users are able to easily and optionally modify install the control function of the power saving mode based on the system operation.

DESCRIPTION OF THE PREFERRED EMBODIMENTS

An embodiment of the present invention will be described below with reference to the drawings.

Figure 1:
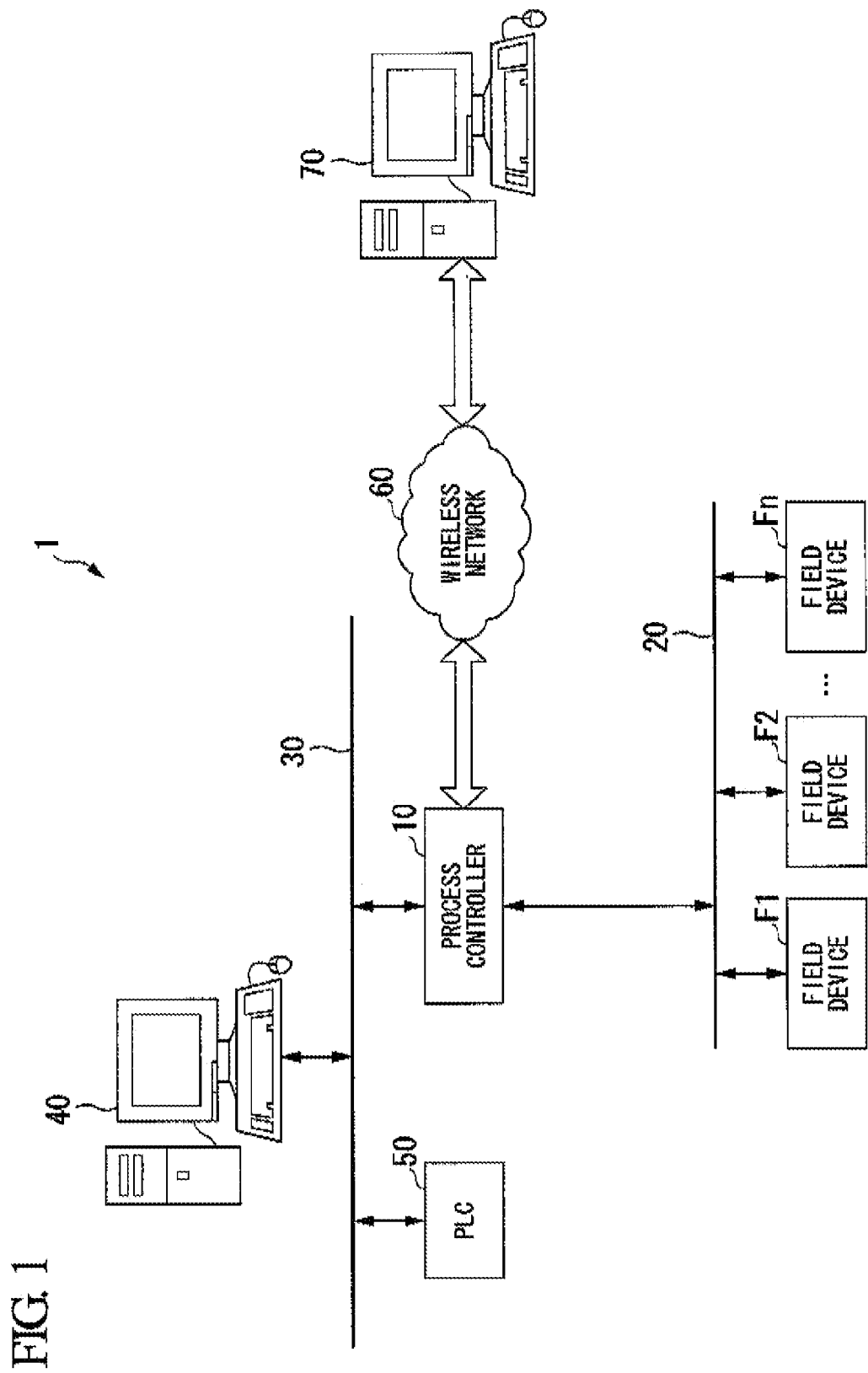
FIG. 1 is a schematic diagram illustrating the configuration of a process control system which includes a process controller (a control device) according to an embodiment of the present invention.

FIG. 1 is a schematic diagram illustrating the configuration of a process control system which includes a process controller (a control device) according to this embodiment of the present invention. The control system according to the present embodiment will be described by illustrating as an example a process control system which can be used in a chemical plant such as an oil field or a gas field.

As shown in FIG. 1, the process control system 1 according to the present embodiment includes a process controller 10 (a control device), a field bus 20, n of field devices F1 to Fn, a LAN 30 (Local Area Network), a maintenance management terminal 40, a PLC 50 (Programmable Logic Controller), a wireless network 60, and a remote monitoring terminal 70. For example, the maintenance management terminal 40 works as an upper terminal.

The process controller 10 is connected to each of field devices F1 to Fn via the field bus 20 so that the process controller 10 is able to communicate with each of the field devices F1 to Fn via the field bus 20. In addition, the process controller 10 is connected to the maintenance management terminal 40 and the PLC 50 via the LAN 30 so that the process controller 10 is able to communicate with the maintenance management terminal 40 and the PLC 50. In addition, the process controller 10 is connected to the remote monitoring terminal 70 via the wireless network 60 so that the process controller 10 is able to communicate with the remote monitoring terminal 70.

The process controller 10 controls each of the field devices F1 to Fn which are control objects, in accordance with a process control program which was generated in advance by a predetermined programming language.
In the present embodiment, the predetermined programming language is defined in an IEC 61131 which is the international standard of a PLC language. The process controller 10 transmits a process data, which has been collected from each of the field devices F1 to Fn, to the maintenance management terminal 40 and the PLC 50 via the LAN 30. In addition, the process controller 10 transmits the process data, which has been collected from each of the field devices F1 to Fn, to the remote monitoring terminal 70. The configuration of the process controller 10 will be described in details later.

For example, the field bus 20 is a data communication bus which follows the field bus communication standard such as a Foundation Fieldbus FF-H1 or a Profibus-PA. For example, the field devices F1 to Fn are measurement devices or process control devices such as a thermometer, a pressure meter, a flow meter, or an electronic control valve. Each of the field devices F1 to Fn transmits a process data (for example, a temperature, a pressure, a flow rate, or an opening of the valve) to the process controller 10 via the filed bus 20 in response to a request from the process controller 10. Each of the field devices F1 to Fn performs a process control (for example, an opening or closing of the valve, a temperature adjustment, and a pressure adjustment) in response to a request from the process controller 10.

The LAN 30 is a local network based on the LAN standard such as the Ethernet which is located in a chemical plant. The maintenance management terminal 40 is a terminal which is used by a field engineer. The maintenance management terminal 40 stores and manages a process data which is transmitted from the process controller 10 via the LAN 30. The field engineer is allowed to read a process data using the maintenance management terminal 40. In addition, the field engineer is also allowed to perform a maintenance inspection operation of the process controller 10 or the PLC 50. The PLC 50 is a sequence control device which controls field devices (not shown) which belong to a different system from the process controller 10. The PLC 50 has a function of supporting a process control of a whole system, by transmitting and receiving a process data with the process controller 10. A plurality of PLCs 50 may be provided in the process control system 1.

The wireless network 60 includes a wireless base station or a public switched telephone network. The wireless network 60 allows a wireless communication between the process controller 10, which is provided in the chemical plant, and the remote monitoring terminal 70, which is provided in a remote location (for example, management office where a system administrator resides). The remote monitoring terminal 70 is a terminal which is used by a system administrator. The remote monitoring terminal 70 stores and manages a process data which is transmitted from the process controller 10 via the wireless network 60. The system administrator is allowed to read (monitor) a process data using the remote monitoring terminal 70, even lithe system administrator resides in a remote location, and is also allowed to control the process controller 10.

Figure 2:
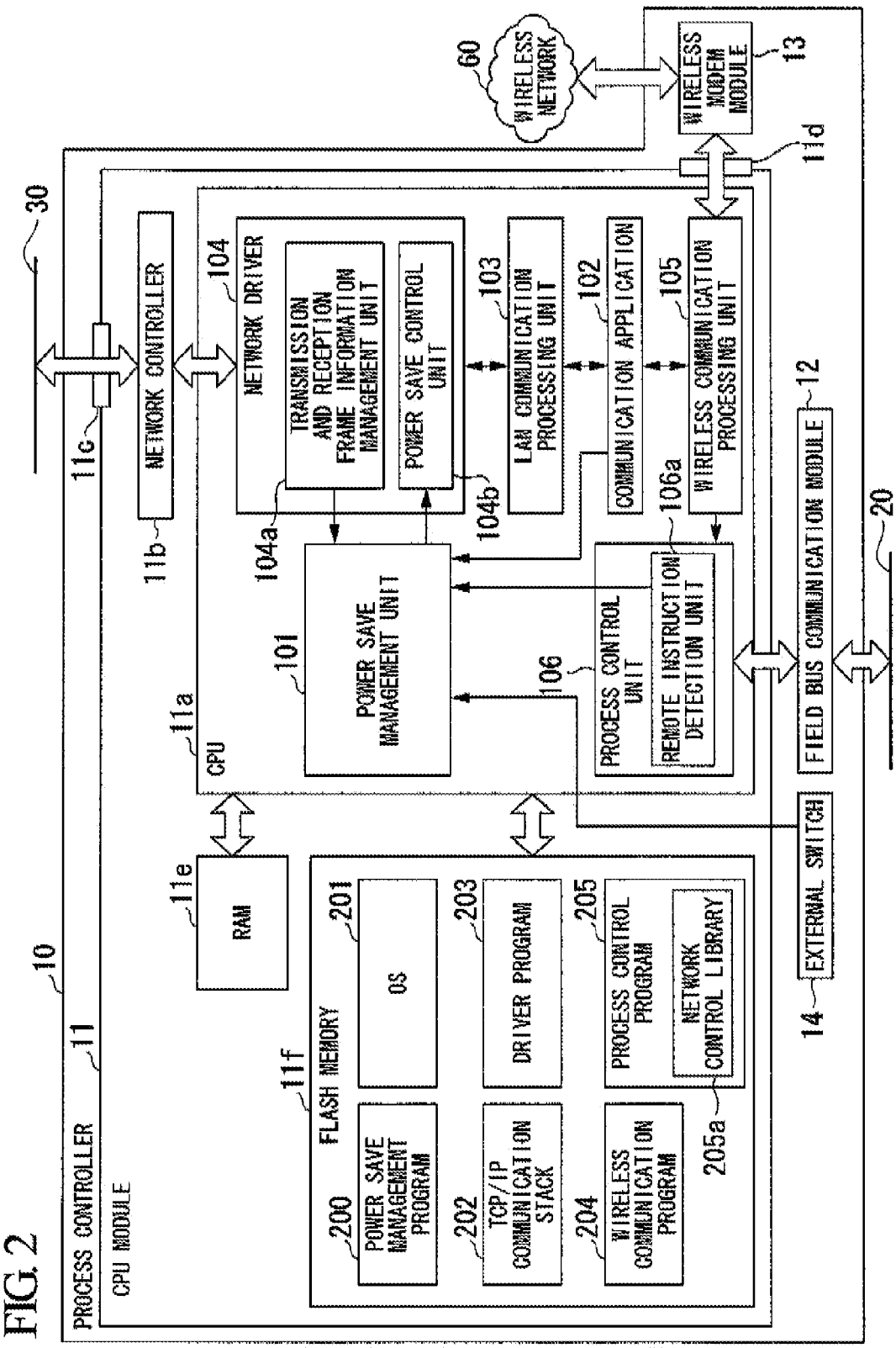
FIG. 2 is a block diagram illustrating the detailed configuration of the process controller included in the process control system according to the embodiment of the present invention.

Then, the inner configuration of the process controller 10 will be described in details with reference to FIG. 2. FIG. 2 is a block diagram illustrating the configuration of the process controller included in the process control system according to the embodiment of the present invention. As shown in FIG. 2, the process controller 10 may mainly include, but is not limited to, a CPU (Central Processing Unit) module 11, a field bus communication module 12, a wireless modem module 13 and an external switch 14. The process controller 10 includes integrations of various modules such as power module. However, in the present embodiment, the explanations of the various modules thereof will be omitted.

The CPU module 11 includes a CPU 11a, a network controller 11b (communication unit), an Ethernet input and output port 11c, an RS232C input and output port 11d, a RAM (Random Access Memory) 11e and a flash memory 11f. The CPU module 11 is connected to the LAN 30 via the Ethernet input and output port 11c by a LAN cable (not shown). In addition, the CPU module 11 is connected to the wireless modem module 13 via the RS232C input and output port 11d and a RS232C cable (not shown).

The CPU 11a is a central processing unit which totally controls whole operations of the process controller 10 in accordance with various programs which are stored in the flash memory 11f. The CPU 11a includes a power saving management unit 101, a communication application 102, a LAN communication processing unit 103, a network driver 104, a wireless communication processing unit 105, and a process control unit 106, as functions which are realized by performing various programs. The function of the network driver 104 includes a transmission-reception frame information management unit 104a and a power saving control unit 104b. The function of the process control unit 106 includes a remote instruction detection unit 106a.

The remote instruction detection unit 106a, the power saving management unit 101 and the power saving control unit 104b in combination correspond to a mode control unit. The power saving management unit 101 and the power saving control unit 104b in combination correspond to a power saving control unit.

The function of the power saving management unit 101 is realized by performing a power saving management program 200 which is stored in the flash memory 11f by the CPU 11a. The power saving management unit 101 supplies an instruction, which switches the power saving mode between the ON-state and the OFF-state, to the power saving control unit 104b based on the followings: a power saving control parameter (mode control parameter) which is stored in the flash memory 11f, an information which relates to a transmission-reception frame supplied from the transmission-reception frame information management unit 104a (the number of reception packets and transmission packets of every kind of frames), a transmission request of a transmission frame input from the communication application 102, a mode control signal input from the remote instruction detection unit 106a of the process control unit 106, and an ON/OFF state of the external switch 14.

Here, the power saving control parameter indicates a frame classification which includes a monitoring time and a monitoring object of a transmission-reception frame which is transmitted and received by the network controller 11*b*. The power saving control parameter is also called a frame-related information. The frame classification is also called a frame type. The power saving control parameter is downloaded to the process controller 10 by a configurator function of either the maintenance management terminal 40 or the remote monitoring terminal 70, and the power saving control parameter is stored in the flash memory 11*f*.

The communication application 102 is a function which is realized by the CPU 11*a* which performs a basic application which is installed in an OS (Operating System) 201 which is stored in the flash memory 11*f*. For example, the base application is a communication stack (for example, an OPC, a MODUS, and a HSE) with a WEB server, an FTP, or an SCADA system. The communication application 102 controls a data communication of the process controller 10 to the maintenance management terminal 40, the PLC 50 and the remote monitoring terminal 70. The communication application 102 supplies a transmission request to the power saving management unit 101, when the network controller 11*b* transmits the transmission frame.

The LAN communication processing unit 103 is a function which is realized by the CPU 11*a* which performs a TCP/IP communication stack 202 which is stored in the flash memory 11*f*. The LAN communication processing unit 103 generates a transmission frame by performing a TCP/IP protocol process to the transmission data (process data) which is input from the communication application 102, and the LAN communication processing unit 103 supplies the transmission data to the network driver 104. The LAN communication processing unit 103 removes IP header and footer, and extracts a reception data (payload portion) by performing a TCP/IP protocol process to a reception frame which is input via the network driver 104. The LAN communication processing unit 103 supplies the reception data to the communication application 102.

The network driver 104 is a function which is realized by performing a driver program 203 which is stored in the flash memory 11*f* by the CPU 11*a*. The network driver 104 controls the network controller 11*b*, such that a transmission frame which is transmitted to the maintenance management terminal 40 and the PLC 50 via the LAN 30. The network driver 104 supplies the reception frame which is received from the maintenance management terminal 40 and the PLC 50 to the LAN communication processing unit 103.

The transmission-reception frame information management unit 104*a* which is one function of the network driver 104 manages an information which relates to a transmission-reception frame which is transmitted and received by the network controller 11*b*, and supplies the information to the power saving management unit 101. For example, the transmission-reception frame information management unit 104*a* manages statistics information (the number of reception packets for every frame classification) which is input from the network controller 11*b*. The transmission-reception frame information management unit 104*a* manages statistics information (the number of transmission packets for every frame classification) which is input from the LAN communication processing unit 103.

The power saving control unit 104*b* which is one function of the network driver 104 controls the ON/OFF state of the power saving mode which is mounted on the network controller 11*b* based on instructions, which switch the power saving mode between the ON-state and the OFF-state, wherein the power saving mode is input from the power saving management unit 101.

The wireless communication processing unit 105 is a function which is realized by performing the wireless communication program 204 which is stored in the flash memory 11*f* by the CPU 11*a*. The wireless communication processing unit 105 generates a transmission frame by performing a protocol process which is similar to a communication protocol of the wireless network 60 to a transmission data (process data) which is input form the communication application 102. The wireless communication processing unit 105 supplies the transmission frame to the wireless modem module 13 via the RS232C input and output port 11*d*. The wireless communication processing unit 105 performs a predetermined protocol process to a reception frame which is input from the wireless modem module 13 via the RS232C input and output port 11*d*. Therefore, the wireless communication processing unit 105 extracts a reception data (payload portion), and the wireless communication processing unit 105 supplies the reception data to the communication application 102 and the process control unit 106.

The process control unit 106 is a function which is realized by the CPU 11*a* which performs a process control program 205 which is stored in the flash memory 11*f*. The process control unit 106 controls each field devices F1 to Fn via the field bus communication module 12. The process control unit 106 collects a process data from each field devices F1 to Fn, and the process control unit 106 stores the process data in the RAM 11*e*. In other words, the communication application 102 transmits the process data, which has been stored in the RAM 11*e* by the process control unit 106, to the maintenance management terminal 40, the PLC 50 and the remote monitoring terminal 70.

The process control program 205 is a program which is generated by using a programming language which is defined in the IEC 61131 which follows the international standard of the PLC language. It is well known that the programming language which is defined in the IEC 61131 includes five classifications of languages (an instruction list, a rudder diagram, a function block diagram, a structured text, a sequential function chart). An end user is allowed to freely select a language among the aforementioned five kind of languages.

In the IEC 61131, software parts which have a predetermined function (a general function) are defined as a library. The end user is allowed to select a predetermined software part among the library, and the end user is allowed to define relationships between the software components to realize the predetermined function. Therefore, the end user is allowed to easily generate the process control program 205.

The remote instruction detection unit 106*a* is also one function of the process control unit 106 realized by the CPU 11*a* which performs the process control program 205. In the present embodiment, a special library (a network control library 205*a*) is installed to realize the remote instruction detection unit 106*a*. In other words, the network control library 205*a* stores software components which are necessary to realize the process control unit 106.

Figure 3:
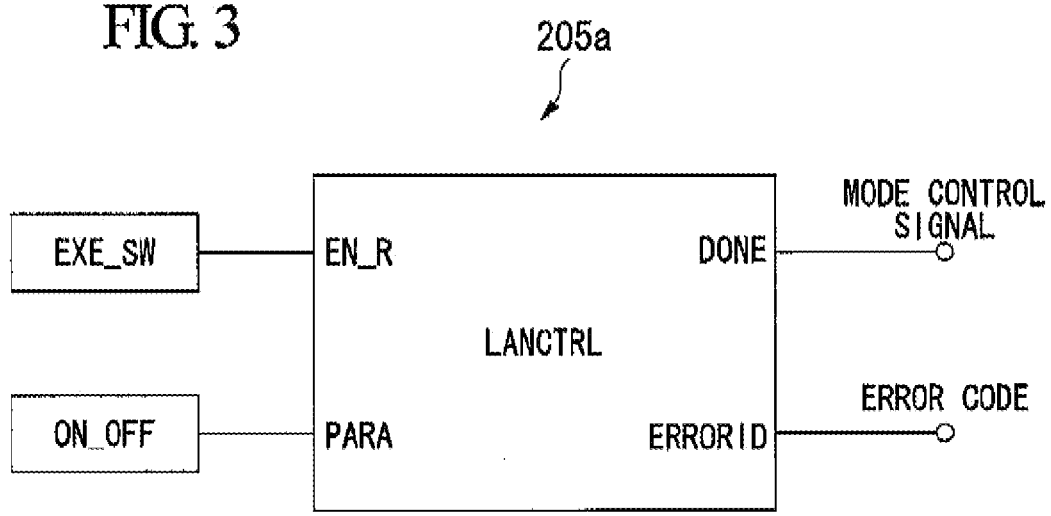
FIG. 3 is a diagram showing a network control library which is used in the process controller included in the process control system according to the embodiment of the present invention.

FIG. 3 is a diagram showing a network control library which is used in the process controller included in the process control system according to the embodiment of the present invention. In FIG. 3, the network control library 205*a* is generated by using a function block diagram. As shown in FIG. 3, the network control library 205*a* has a function block "LANCTRL" which includes an input terminals "EN_R" and "PARA", and output terminals "DONE" and "ERRORID". A value of the output terminal "DONE" changes based on an input valuable "EXE_SW" of the input terminal "EN_R" and an input valuable "ON_OFF" of the input terminal "PARA".

For example, the function block "LANCTRL" is performed when the input valuable "EXE_SW" is "1". In this case, if the input valuable "ON_OFF" is "0", the output terminal "DONE" is "1". In other words, a mode control signal is supplied to the power saving management unit 101 to set the power saving mode to the ON-state. On the other hand, if the input valuable "ON_OFF" is "1", the output terminal "DONE" is "0". In other words, a mode control signal is supplied to the power saving management unit 101 to set the power saving mode to the OFF-state. The output terminal "ERRORID" is normally "0". However, if an error occurs, an error code which indicates a content of the error is supplied as a value of the output terminal "ERRORID".

In other words, the remote instruction detection unit 106a detects the input valuables "EXE_SW" and "ON_OFF" which are included in a reception data (a data which is received from the remote monitoring terminal 70 via the wireless modem module 13) which is input from the wireless communication processing unit 105. Then, the remote instruction detection unit 106a performs the network control library 205a based on the values of the input valuables. Then, the remote instruction detection unit 106a supplies the performed result (a value of the output terminal "DONE") to the power saving management unit 101 as a mode control signal.

The end user generates and installs the network control library 205a which has these functions, such that the values of the input valuables "EXE_SW" and "ON_OFF" of the IEC 61131 are operated. Therefore, the end user is allowed to switch between the ON-state and the OFF-state of the power saving mode of the network controller 11b.

The aforementioned explanation is about the CPU 11a. Then, the explanations of the network controller 11b, the RAM 11e, the flash memory 111, the field bus communication module 12, the wireless modem module 13, and external switch 14 are described below.

The network controller 11b performs a communication connection (TCP/IP connection) with the LAN 30 by the control of the network driver 104. The network controller 11b transmits the transmission frame which is input from the network driver 104 to the maintenance management terminal 40 and the PLC 50 via the LAN 30. The network controller 11b supplies the reception frame which is received from the maintenance management terminal 40 and the PLC 50 via the LAN 30, to the network driver 104.

The network controller 11b has a function of setting to the power saving mode (ON-state) which is the power saving mode and a function of resetting from the power saving mode (OFF-state). The ON-state and the OFF-state are switched by the control of the power saving control unit 104b of the network driver 104. In addition, the power saving mode is an operation mode of reducing power consumption of the network controller 11b by lowering an inner clock frequency of the network controller 11b than that in the normal operation or stopping the inner clock.

The RAM 11e is a volatile working memory which is used for temporary storing of data, when various programs are performed and various calculation processes are performed. The flash memory 11f is rewritable non-volatile memory which stores the aforementioned various programs (the power saving management program 200, the OS 201, the TCP/IP communication stack 202, the driver program 203, a wireless communication program 204, and the process control program 205), and a parameter for controlling a power saving. The aforementioned explanations have been made for the CPU module 11.

The field bus communication module 12 is connected to each of the field devices F1 to Fn via the field bus 20. The field bus communication module 12 converts a control signal which is input from the process control unit 106, to a signal which is based on the communication protocol of the field bus 20, and the field bus communication module 12 transmits the converted signal to each field devices F1 to Fn via the field bus 20, based on the control of the process control unit 106 of the CPU module 11. The field bus communication module 12 converts a process data which is received from each field devices F1 to a data which is based on the communication protocol which is used by the process controller 10 (process control unit 106), based on the control of the process control unit 106 of the CPU module 11.

The wireless modem module 13 establishes a wireless communication connection with the wireless network 60. Then, the wireless modem module 13 generates a wireless transmission signal by performing a digital modulation process to a transmission frame (a digital data) which is input from the wireless communication processing unit 105 of the CPU module 11 via the RS232C input and output port 11d. Then, the wireless modem module 13 transmits the wireless transmission signal to the remote monitoring terminal 70 via the wireless network 60. The wireless modem module 13 generates a reception frame by performing a digital demodulation process to the signal (wireless reception signal) which has been transmitted from the remote monitoring terminal 70 via the wireless network 60. The wireless modem module 13 supplies the reception frame to the wireless communication processing unit 105 of the CPU module 11 via the RS232C input and output port lid.

The external switch 14 is provided outside the body of the process controller 10. The external switch is manually-operable. The external switch 14 supplies a signal (ON/OFF signal) in response to an ON/OFF operation by an end user (for example, a field engineer), to the CPU 11a (the power saving management unit 101).

Then, the operation of the process controller 10 which has the aforementioned configuration will be described below. Especially, a power saving control operation of the network controller 11b by the CPU 11a will be described below.

[1] "a power saving control using the network control library 205a"

(a) "a power saving control based on a remote instruction from the remote monitoring terminal 70"

Firstly, the power saving control using the network control library 205a will be described below. Especially, the power saving control based on a remote instruction from the remote monitoring terminal 70 will be described below.

A system administrator who resides a remote location operates the remote monitoring terminal 70. Especially, the system administrator sets values of the input valuables "EXE_SW" and "ON_OFF". Then the system administrator transmits a remote instruction (input valuables "EXE_SW" and "ON_OFF") which relates the power saving mode via the wireless network 60 front the remote monitoring terminal 70.

In this case, the remote instruction detection unit 106a of the CPU 11a of the process controller 10 detects the values of the input valuables "EXE_SW" and "ON_OFF" which are included in the reception data. In other words, the reception data is received from the remote monitoring terminal 70 via the wireless modem module 13. The remote instruction detection unit 106a performs the network control library 205a in response to the values of the input valuables. Then, the remote instruction detection unit 106a supplies the performed result (the value of the output terminal "DONE") to the power saving management unit 101 as a mode control signal.

The remote instruction detection unit 106a supplies a mode control signal ("1") which switches the power saving mode into the ON-state, when the input valuable "EXE_SW" is "1" and the input valuable "ON_OFF" is "0". On the other hand, the remote instruction detection unit 106a supplies a mode control signal ("0") which switches the power saving mode into the OFF-state, when the input valuable "EXE_SW" is "1" and the input valuable "ON_OFF" is "1".

When the mode control signal is "1", the power saving management unit 101 supplies an instruction which sets the power saving mode to the ON-state, to the power saving control unit 104b of the network driver 104, based on the mode control signal which is input from the remote instruction detection unit 106a. In this case, the power saving control unit 104b switches the power saving mode of the network controller 11b to the ON-state. Therefore, the network controller 11b is set to the power saving mode, and it is possible to reduce the power consumption of the power saving controller 104b.

On the other hand, when the mode control signal is "0", the power saving management unit 101 supplies an instruction which switches the power saving mode to the OFF-state, to the power saving control unit 104b of the network driver 104. In this case, the power saving control unit 104b switches the power saving mode of the network controller 11b to the OFF-state.

Therefore, the network controller 11b is reset to a normal operation mode from the power saving mode, and the process controller 10 normally performs data communication with the maintenance management terminal 40 and the PLC 50.

If the system administrator who resides at a remote location operates the remote monitoring terminal 70 (in other words, the system administrator sets the input valuables "EXE_SW" and "ON_OFF"), the system administrator is allowed to switch the power saving mode of the network controller 11b into the ON-state or the OFF-state in a predetermined timing.

For example, when the field engineer performs maintenance inspection operation of the process controller 10 using the maintenance management terminal 40, and if the network controller 11b is in the power saving mode, the maintenance management terminal 40 is not able to communicate with the process controller 10. In other words, the field engineer is not able to perform a maintenance inspection operation. In this case, the system administrator resets the network controller 11b to the normal operation mode from the power saving mode by operating the remote monitoring terminal 70. Therefore, the maintenance management terminal 40 is allowed to communicate with the process controller 10. After the maintenance inspection operation is finished by the field engineer, the system administrator is allowed to set the network controller 11b to the power saving mode again from the normal operation mode by operating the remote monitoring terminal 70. The process controller 10 according to the present embodiment can improve the convenience of the maintenance inspection operation in the field.

As described above, the remote instruction detection unit 106a is an application which is generated by the IEC 61131. The remote instruction from the remote monitoring terminal 70 is supplied by operating the valuable of the IEC 61131, which is similar to the operating and monitoring normal control data. Therefore, it is unnecessary to install a special communication protocol to transmit the remote instruction from the remote monitoring terminal 70, and it is possible to perform a power saving control from a remote location using a communication protocol of general SCADA system.

(b) "a power saving control based on a time management"

Then, the power saving control using the network control library 205a will be described below. Especially, the power saving control based on the time management will be described below. In the following explanation, the remote monitoring terminal 70 is connected to the LAN 30. The process controller 10 transmits process data which is collected by the process controller 10, to the remote monitoring terminal 70 via the LAN 30, the collected process date being transmitted one time per one hour.

In this case, a logic which will be described below can be established using an application of the IEC 61131 to temporarily release the network from the power saving mode only when data is transmitted (reset the power saving mode), whereby the temporary release from the power saving mode will reduce the power consumption.

(i) The values of the input valuables "EXE_SW" and "ON_OFF" are set to "1", the setting being made one time per one hour, and the power saving mode of the network controller 11b is reset to the normal operation mode using the network control library 205a.

(ii) A collected process data is transmitted to the remote monitoring terminal 70 via the LAN 30.

(iii) After the data is transmitted, the input valuable "EXE_SW" is set to "1", and the input valuable "ON_OFF" is set to "0".

The power saving mode of the network controller 11b is set to the ON-state using the network control library 205a.

(c) "a power saving control based on the data which is received from the field bus 20"

Then, the power saving control using the network library 205a will be described below. Especially, the power saving control based on the data which is received from the field bus 20 will be described below. Hereafter, the remote monitoring terminal 70 is connected to the LAN 30. Then, the process controller 10 transmits the process data which is collected by the process controller 10, to the remote monitoring terminal 70 via the LAN 30.

In the power saving control based on the data which is received from the field bus 20, validation or invalidation (the ON-state or the OFF-state of the power saving mode) of the network is controlled, by operating the input valuables "EXE_SW" and "ON_OFF" using the data which is received from the field bus 20, the input valuables "EXE_SW" and "ON_OFF" being used as a trigger. Especially, when an abnormal data is received from the field bus 20, the values of the input valuables "EXE_SW" and "ON_OFF" are set to "1". Then, the power saving mode of the network controller 11b is reset to the normal operation mode using the network control library 205a. Then, an abnormal message is transmitted to the remote monitoring terminal 70 via the LAN 30. These logics are installed by the application of the IEC 61131.

As described above, in the present embodiment, the network control library 205a is installed, which is generated by the IEC 61131, and which has a control function of the power saving mode of the network controller 11b. Therefore, the end user (for example, the system administrator or the field engineer) is allowed to easily and optionally modify and install the control function of the power saving mode in response to the system operation.

[2] "a power saving control by operations of the external switch 14"

Then, the manual power saving function which is included in the process controller 10 will be described below. Especially, the power saving control by the operation of the external switch 14 will be described below.

If the field engineer switches between the ON-state and the OFF-state of the external switch 14, the external switch 14 supplies a signal (an ON signal or an OFF signal) in response to the switching to the CPU 11a (the power saving management unit 101). If the ON signal is input from the external switch 14, the power saving management unit 101 supplies an instruction which switches the power saving mode into the ON-state, to the power saving control unit 104b of the network driver 104. In this case, the power saving control unit 104b switches the power saving mode of the network controller 11b into the ON-state. Therefore, the network controller 11b is set to the power saving mode, and it is possible to reduce the power consumption.

On the other hand, if the OFF signal is input from the external switch 14, the power saving management unit 101 supplies an instruction which switches the power saving mode into the OFF-state, to the power saving control unit 104b of the network driver 104. In this case, the power saving control unit 104b switches the power saving mode of the network controller 11b into the OFF-state. Therefore, the network controller 11b is reset to the normal operation mode from the power saving mode, and the process controller 10 normally performs a data communication with the maintenance management terminal 40 and the PLC 50.

As described above, the field engineer is allowed to switch the power saving mode of the network controller 11b into the ON-state or the OFF-state, by operating the external switch 14, in an optional timing. In some cases, the power saving control by the remote instruction from the remote monitoring terminal 70 may conflict with the power saving control by the operation of the external switch 14. For example, that is the case that the OFF-state of the power saving mode is instructed by the operation of the external switch 14, while the power saving mode is set into the ON-state by the remote instruction from the remote monitoring terminal 70. Considering the case that two instructions are conflicted, it is preferable to determine which the remote instruction by the remote monitoring terminal 70 or the operation instruction by the external switch 14 is superiorly used (priority level).

[3] "automatic power saving function"

(a) "a power saving control by monitoring of a reception frame"

Then, the automatic power saving function which is included in the process controller 10 will be described below. Especially, the power saving control by the monitoring of the reception frame will be described below.

In the conventional art, as an automatic saving function, the data (the reception frame) which is received by the network controller 11b is monitored, and the network controller 11b is set to the power saving mode, when the reception frame is not received in a monitoring time. As described above, in the conventional art, by determining whether or not the reception frame is received in a predetermined time, without identifying the classification of the reception frame, the power saving mode is controlled. For example, in the system which frequently communicates broadcast frames, there may occur a problem that the automatic power saving function becomes dysfunctional.

In contrast to this, in the process controller 10 according to the present embodiment, the configurator 100 sets the monitoring time of the reception frame which is received by the network controller 11b, and the frame classification which is the monitoring object, as parameters for controlling power saving. In addition, the transmission-reception frame information management unit 104a manages the reception-frame-related information (statistics information of the number of the reception packets for every frame classification) which is received by the network controller 11b, and the transmission-reception frame information management unit 104a supplies the information to the power saving management unit 101.

In this case, as the frame classifications which are managed by the transmission-reception frame information management unit 104a, an information which can be filtered in response to various elements (for example, a broadcast, a unicast, a multicast, an ICMP, a UDP, a TCP, or a port number) may be used.

Then, the power saving management unit 101 determines whether or not the reception frame which belongs to the frame classification which is the monitoring object is received in the monitoring time, base on the information which is supplied from the transmission-reception frame information management unit 104a. If the power saving management unit 101 determines that the reception frame is not received, the power saving management unit 101 supplies instructions which switch the power saving mode into the ON-state, to the power saving control unit 104b. Therefore, the network controller 11b is set to the power saving mode, and it is possible to reduce the power consumption.

As described above, the process controller 10 according to the present embodiment is able to optionally perform a configuration to the classification of the reception frame. Therefore, it is possible to perform suitable automatic power control in response to the usage, by filtering the reception frame which is the monitoring object. Recently, a problem of a network attack by malicious stranger (for example, a cyber attack) occurs. However, it is possible to prevent an interference of the power saving function by the network attack, by performing a complaisant filtering to the reception data using aforementioned function.

(b) "a power saving control by the monitoring of a transmission frame"

Then, the automatic power saving function which is included in the process controller 10 will be described below. Especially, the power saving control by the monitoring of a transmission frame will be described below.

In the conventional art, as the automatic power saving function, the data (the reception frame) which is received by the network controller 11b is monitored. Then, if the reception frame is not received in the monitoring time, the network controller 11b is set to the power saving mode. In the conventional art, it is possible to realize an automatic power saving function, because the reception frame is only monitored. However, in an active process controller (in other words, a process controller which regularly transmits the data to the upper system), it is not possible to set the network controller 11b, which is in the time period which the communication is not performed, to the power saving mode.

In contrast to this, in the process controller 10 according to the present embodiment, the configurator 100 sets the monitoring time of the transmission frame which is transmitted by the network controller 11b, and the frame classification which is the monitoring object. The monitoring time and the frame classification are set as the parameter for controlling the power saving. In addition, the transmission-reception frame information management unit 104a of the network driver 104 manages transmission-frame-related information (the statistics information of the number of the transmission packets for every frame classification), and the transmission-reception frame information management unit 104a supplies the information to the power saving management unit 101.

In this case, as the frame classification which is managed by the transmission-reception frame information management unit 104a, the information which can be filtered by various elements (for example, a broadcast, a unicast, a multicast, an ICMP, a UDP, a TCP, or a port number) may be used.

Then, the power saving management unit 101 determines whether or not the transmission frame which corresponds to the frame classification which is the monitoring object is transmitted during the monitoring time, based on the information which is supplied from the transmission-reception frame information management unit 104a. If the power saving management unit 101 determines that the transmission frame is not transmitted, the power saving management unit 101 supplies an instruction which switches the power saving mode into the ON-state, to the power saving control unit 104b. Therefore, the network controller 11b is set to the power saving mode, and it is possible to reduce the power consumption.

As described above, the process controller 10 according to the present embodiment monitors not only the reception frame but the transmission frame. Then, if the transmission frame is not transmitted during the predetermined time, the process controller 10 is able to automatically set the network controller 11b to the power saving mode. In addition, there may be a case (for example, ARP frame), which the transmission frame is transmitted during a timing which the user does not intend from the network stack. Therefore, the automatic power saving function may not work in the timing which the user intends. In this case, the process controller 10 is able to realize the automatic power saving function which the user intends, by complaisantly setting the frame classification which is the monitoring object of the transmission frame.

[4] "reset from the power saving mode"

In the aforementioned description [3], the automatic power saving control relates to the ON-state of the power saving mode. Hereinafter, the automatic power saving control relates to the OFF-state of the power saving mode.

If the communication application 102 transmits the transmission frame using the network controller 11b, the communication application 102 supplies the transmission request to the power saving control unit 101. In this case, the power saving management unit 101 supplies an instruction which switches the power saving mode into the OFF-state, to the power saving control unit 104b of the network driver 104. In this case, the network controller 11b is reset to the normal operation mode from the power saving mode, and the process controller 10 performs the data communication with the maintenance management terminal 40 and the PLC 50, because the power saving control unit 104b controls the power saving mode of the network controller 11b.

As described above, in the present embodiment, if the data is transmitted regularly (for example, every one hour) to the maintenance management terminal 40, the network controller 11b is set to the power saving mode during a time period which is unnecessary to transmit the data, and the network controller 11b is reset to the normal operation mode from the power saving mode in the timing of the data transmission. These make it possible to reduce the power consumption.

In addition, if the manual power saving function conflicts the automatic power saving function (in other words, the network controller 11b is set to the ON-state of the power saving mode), the OFF-state of the power saving mode may be instructed by the automatic power saving function. Considering the case that two instructions are conflicted, it is better to determine in advance which the manual power saving function or the automatic power saving function is superiorly used (priority level).

In the aforementioned embodiment, as the control system, the process control system 1 which is used in the chemical plant (for example, an oil field or a gas field) is described. Then, as the control device, the process controller 10 which is used for the process control system as the control device is described. The present invention is not limited to these applications. For example, the present invention may be applicable to the control device which is necessary to reduce the power consumption, or the control system which includes the control device.

In the aforementioned embodiment, the network control library 205a is generated using the function block diagram. However, the network control library 205a may be generated using other PLC language. In the aforementioned embodiment, as the description language of the network control library 205a and the control program, the PLC language which is defined in the IEC 61131 is used. However, the present invention may be adapted to the system which uses other programming language.

What is claimed is:

1. A control device comprising:
  a communication unit which has a switch function of switching the control device into a power saving mode, the communication unit communicating with an upper terminal via a first network;
  a mode control unit which controls switching the communication unit into the power saving mode, the control being made using a network control library which is generated by a programming language;
  a memory unit which stores a monitoring time and a frame classification as a mode control parameter, the monitoring time being a time for monitoring a transmission-reception frame transmitted and received by the communication unit, the frame classification designating a group of frames which are subject to the monitoring; and
  a transmission-reception frame information management unit which manages a frame-related information that includes the monitoring time and the frame classification,
  wherein the network control library is a software component which has a function of outputting a value which is necessary to control switching the control device into the power saving mode, the control being made according to at least one input value,
  the mode control unit comprises:
    a remote instruction detection unit which detects the input value which is included in a remote instruction given by a remote monitoring terminal via a second network which is different from the first network, and the remote instruction detection unit outputting an output value as a mode control signal, the output value being obtained from the network control library based on the detected input value; and
    a power saving control unit which controls switching the control device into the power saving mode, the control being made based on the mode control signal,
  the power saving unit determines whether or not in the monitoring time there is performed at least one of transmission and reception of the transmission-reception frame classified in the group of frames subject to the monitoring, the determination being made based on the frame-related information, and
  the power saving unit selects the power saving mode if in the monitoring time there is not performed the at least one of transmission and reception of the transmission-reception frame.

2. A control device comprising:
  a communication unit which has a switch function of switching the control device into a power saving mode, the communication unit communicating with an upper terminal via a first network; and
  a mode control unit which controls switching the communication unit into the power saving mode, the control being made using a network control library which is generated by a programming language, wherein the network control library is a software component which has a function of outputting a value which is necessary to control switching the control device into the power saving mode, the control being made according to at least one input value, the mode control unit comprises:
a remote instruction detection unit which detects the input value which is included in a remote instruction given by a remote monitoring terminal via a second network which is different from the first network, and the remote instruction detection unit outputting an output value as a mode control signal, the output value being obtained from the network control library based on the detected input value; and a power saving control unit which controls switching the control device into the power saving mode, the control being made based on the mode control signal, and the power saving unit switches the power saving mode to an OFF-state when the power saving unit receives a request of transmitting the transmission frame from a communication application of the control device.

3. A control device comprising:
a communication unit which has a switch function of switching the control device into an a power saving mode, the communication unit communicating with an upper terminal via a first network;
a mode control unit which controls switching the communication unit into the power saving mode, the control being made using a network control library which is generated by a programming language, and
a manually-operable switch, wherein the network control library is a software component which has a function of outputting a value which is necessary to control switching the control device into the power saving mode, the control being made according to at least one input value, the mode control unit comprises:
a remote instruction detection unit which detects the input value which is included in a remote instruction given by a remote monitoring terminal via a second network which is different from the first network, and the remote instruction detection unit outputting an output value as a mode control signal, the output value being obtained from the network control library based on the detected input value; and a power saving control unit which controls switching the control device into the power saving mode, the control being made based on the mode control signal, and the power saving control unit controls switching the power saving mode between the ON-state and the OFF-state, the control being made by ON-OFF operations of the switch.

4. A control system comprising:
a control device;
a control object device to be controlled by the control device;
an upper terminal that is capable of communication to the control device through a first network;
a memory unit which stores a monitoring time and a frame classification as a mode control parameter, the monitoring time being a time for monitoring a transmission-reception frame transmitted and received by the communication unit, the frame classification designating a group of frames which are subject to the monitoring; and a transmission-reception frame information management unit which manages a frame-related information that includes the monitoring time and the frame classification, wherein the control device comprises:
a communication unit which has a switch function of switching the control device into an a power saving mode, the communication unit communicating with an upper terminal via a first network; and
a mode control unit which controls switching the communication unit into the power saving mode, the control being made using a network control library which is generated by a programming language, the network control library is a software component which has a function of outputting a value which is necessary to control switching the control device into the power saving mode, the control being made according to at least one input value, the mode control unit comprises:
a remote instruction detection unit which detects the input value which is included in a remote instruction given by a remote monitoring terminal via a second network which is different from the first network, and the remote instruction detection unit outputting an output value as a mode control signal, the output value being obtained from the network control library based on the detected input value; and a power saving control unit which controls switching the control device into the power saving mode, the control being made based on the mode control signal, the power saving unit determines whether or not in the monitoring time there is performed at least one of transmission and reception of the transmission-reception frame classified in the group of frames subject to the monitoring, the determination being made based on the frame-related information, and the power saving unit selects the power saving mode if in the monitoring time there is not performed the at least one of transmission and reception of the transmission-reception frame.

5. A control system comprising:
a control device;
a control object device to be controlled by the control device; and
an upper terminal that is capable of communication to the control device through a first network, wherein the control device comprises:
a communication unit which has a switch function of switching the control device into an a power saving mode, the communication unit communicating with an upper terminal via a first network; and
a mode control unit which controls switching the communication unit into the power saving mode, the control being made using a network control library which is generated by a programming language, the network control library is a software component which has a function of outputting a value which is necessary to control switching the control device into the power saving mode, the control being made according to at least one input value, the mode control unit comprises:
a remote instruction detection unit which detects the input value which is included in a remote instruction given by a remote monitoring terminal via a second network which is different from the first network, and the remote instruction detection unit outputting an output value as a mode control signal, the output value being obtained from the network control library based on the detected input value; and a power saving control unit which controls switching the control device into the power saving mode, the control being made based on the mode control signal, and the power saving unit switches the power saving mode to an OFF-state when the power saving unit receives a request of transmitting the transmission frame from a communication application of the control device.

6. A control system comprising:

a manually-operable switch, a control device;

a control object device to be controlled by the control device; and an upper terminal that is capable of communication to the control device through a first network, wherein the control device comprises:

a communication unit which has a switch function of switching the control device into an a power saving mode, the communication unit communicating with an upper terminal via a first network; and a mode control unit which controls switching the communication unit into the power saving mode, the control being made using a network control library which is generated by a programming language, the network control library is a software component which has a function of outputting a value which is necessary to control switching the control device into the power saving mode, the control being made according to at least one input value, the mode control unit comprises;

a remote instruction detection unit which detects the input value which is included in a remote instruction given by a remote monitoring terminal via a second network which is different from the first network, and the remote instruction detection unit outputting an output value as a mode control signal, the output value being obtained from the network control library based on the detected input value; and a power saving control unit which controls switching the control device into the power saving mode, the control being made based on the mode control signal, and the power saving control unit controls switching the power saving mode between the ON-state and the OFF-state, the control being made by ON-OFF operations of the switch.

* * * * *